United States Patent [19]  [11] 4,206,631
Nysse et al.  [45] Jun. 10, 1980

[54] INFLATABLE PRODUCT TESTING

[75] Inventors: Karel J. Nysse; Hermanus J. Beentjes, both of Featherston; Terence A. Mancer, Carterton, all of New Zealand

[73] Assignee: Batavian Rubber Company Limited, Featherston, New Zealand

[21] Appl. No.: 25,557

[22] Filed: Mar. 30, 1979

[30] Foreign Application Priority Data

Jun. 2, 1978 [NZ] New Zealand ............... 187465

[51] Int. Cl.² ............................................. G01M 3/26
[52] U.S. Cl. ......................................................... 73/40
[58] Field of Search ............................ 73/40, 37, 45.5

[56] References Cited

U.S. PATENT DOCUMENTS

| 2,054,204 | 9/1936 | McDonald | 73/45.5 |
| 2,074,140 | 3/1937 | Bates | 73/40 X |
| 2,126,434 | 8/1938 | Vosbury | 73/37 |
| 2,370,945 | 3/1945 | Fields | 73/37 |
| 2,800,788 | 7/1957 | Smith | 73/40 |
| 2,988,913 | 6/1961 | D'Amico | 73/37 |
| 3,166,439 | 1/1965 | Dennhofer | 73/45.5 X |
| 3,315,519 | 4/1967 | Ferguson | 73/40 |
| 3,603,138 | 9/1971 | Peterson | 73/37 |
| 3,991,604 | 11/1976 | Hayes et al. | 73/37 |

FOREIGN PATENT DOCUMENTS

| 264875 | 9/1968 | Austria | 73/40 |
| 1373145 | 4/1964 | France | 73/37 |
| 1295303 | 11/1972 | United Kingdom | 73/40 |

Primary Examiner—Gerald Goldberg
Assistant Examiner—Joseph W. Roskos
Attorney, Agent, or Firm—Holman & Stern

[57] ABSTRACT

A method of testing products capable of being inflated and in particular surgical gloves which involves applying a normally destructive gas pressure thereto while the same is being constrained against substantial inflation and detecting the degree of leakage of the gas owing to leakage flaws or rupture of weak spots and either passing or rejecting the product on the basis thereof. In order to obtain an accurate result the method and the apparatus for performing the method first applies a pressure to the product higher than that from which testing will commence and thereafter reduces the same to the commencement pressure so as to minimise the effect of stress relaxation and creep of the material from which the product is formed.

25 Claims, 14 Drawing Figures

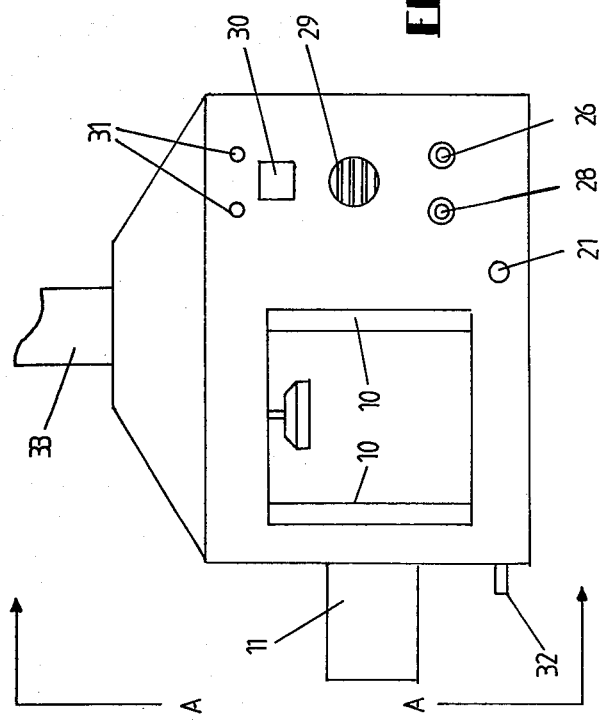
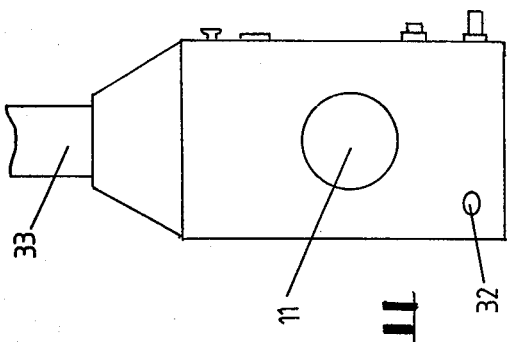

INFLATABLE PRODUCT TESTING

CROSS-REFERENCE TO RELATED APPLICATIONS

This application is a continuation-in-part of our U.S. patent application Ser. No. 919,562, filed June 27, 1978, now abandoned.

BACKGROUND OF THE INVENTION (1) Field of the Invention

The present invention relates to means for and methods of testing for leakage flaws and weak spots of products capable of inflation such as surgical gloves.

(2) Description of the Prior Art

It is well known that in any manufacturing process that in order to maintain a reputation for quality in the eyes of consumers that it is necessary to exercise stringent quality control. This is of particular importance when manufacturing inflatable products as the same require only a minute flaw in order for them to be defective. This is especially the case with surgical gloves because with any flaw that can lead to an aperture or opening no matter how small there is a very considerable risk of infection to the patient.

Currently it is standard to test the integrity of inflatable products and in particular surgical gloves in one of several ways. The most common method is the inflation of the product and the use of visual examination for pinholes and weaknesses. The difficulty with this technique however, which uses only a low inflation pressure e.g. 1-2 lbs per inch$^2$, is that even when for example a surgical glove is blown to a large size the fingers are not inflated and hence remain suspect for holes. Generally these are difficult to detect unless a great deal more time is spent by the tester, i.e. the tester waits for several minutes for the glove to deflate. The other difficulty that arises from the reliance upon visual examination of an inflated glove is that the tester must decide whether or not a weakness is passable or not. When this method is utilised it is often found that when quality is stressed the testers would rather play safe and destroy a glove on the detected weakness (e.g. by applying finger pressure thereto) rather than be reprimanded for the passing of sub-standard gloves thus leading to a high rate of spoilage while at the same time providing only marginal tests on the fingers. Other testing methods employ the use of liquids which even in the absence of pressure can provide a ready indication of a leakage. It is possible also to test using a liquid by applying an electric current to the liquid within the glove and detecting any current passage increase through the glove when the glove is in a second liquid. Such liquid using techniques however are slow and messy and preclude the use of a lubricant dust on the inside face of the gloves unless the same is to be applied afterwards thereby meaning that the testing of the glove occurs not only prior to packaging and sterilisation but also prior to dusting thereby reducing the reliability of the quality control.

U.S. Pat. No. 3,315,519 to W. C. Ferguson discloses a method of testing surgical gloves which utilises gas pressurisation while the glove is confined or constrained. The apparatus disclosed in that specification took no steps to minimise anomalous results that can arise through stress relaxation or creep of the latex rubber from which a surgical glove is formed. Moreover, the apparatus and method disclosed gave rise to a lengthy testing cycle or high inaccuracies owing to the pressure measurement technique and also the fact that steps were not taken to ensure the fingers of the surgical glove were not in contact.

Other testing methods used by manufacturers vary from batch testing to visual checking of deflated gloves over strong light. These techniques however do not provide a high degree of accuracy and hence in the art of manufacture of inflatable products such as balloons gloves etc there is a belief that a high degree of accuracy during other than batch tests is unobtainable without introducing prolonged testing procedures.

BRIEF SUMMARY OF THE INVENTION

It is an object of the present invention to provide means and methods which will overcome at least some of the abovementioned disadvantages or at least provide the public with a useful choice.

Accordingly, in one aspect the present invention consists in a method of testing a product capable of being inflated such as a surgical glove against leakage flaws and substantially weak spots which comprises the steps of:

(a) mounting the product in such a way that the same can be inflated at least partially through an intended opening thereof by applying a gas pressure thereinto, (b) rigidly constraining the product against substantial inflation with constraints which in use do not substantially inhibit leakage of gas through leakage flaws and leakage flaws resulting from the breakage of substantially weak spots of said product, (c) applying a gas pressure to said product so as to attain a first pressure within said product, which said first pressure is a pressure that in the absence of said constraints would be destructive of said product, (d) reducing the pressure within said product upon its attaining said first pressure to a second pressure which itself is a pressure in the absence of said constraints which would be destructive of said product, (e) measuring directly any gas pressure decrease within said product over a testing period commencing upon its attaining said second pressure, and (f) rejecting said product as being defective owing to leakage flaws if said product fails to achieve said first pressure or upon reduction to said second pressure loses pressure unacceptably over said testing period.

In a further aspect the invention consists in apparatus for testing a product capable of being inflated such as a surgical glove which has a single intended opening thereto, said apparatus comprising:

means for sealably mounting said product adjacent and about said single intended opening thereof and capable of allowing the ingress of gas under pressure into and egress of gas from said product, means operable to rigidly constrain said product against substantial inflation in inflatable regions thereof when mounted on the mounting means, means capable in use of applying gas to a predetermined first pressure via the mounting means to a constrained and mounted product and capable of reducing the gas pressure in the product to a second pressure, means in communication with the interior of a product mounted on the mounting means capable of detecting the internal gas pressure thereof, circuit means operatively connected to the means to apply a predetermined first gas pressure and capable of reducing the pressure to a second pressure and to the pressure detecting means and which is capable of generating signals to an operator that a product should be rejected if said first pressure is not attained within some predetermined period of time, is capable of reducing the pressure within the product from said first pressure if that pressure is attained to said second pressure and thereafter is capable of generating a signal if the reduced second pressure it not substantially maintained for a predetermined testing period.

In still a further aspect the invention consists in apparatus for testing a surgical glove which has a single intended opening thereto, said apparatus comprising:

means for sealably mounting a glove at cuff regions thereof and capable of allowing the ingress of gas under pressure into and egress gas from said glove, means operable to rigidly constrain said glove against substantial inflation in inflatable regions thereof when mounted on the mounting means, means capable in use of applying gas to a predetermined first pressure via the mounting means to a constrained glove, means in communication with the interior of a glove mounted on the mounting means capable of detecting the internal gas pressure thereof, circuit means associated with said means in communication with the interior of a glove capable of detecting the pressure thereof which signals a failure to achieve said first pressure in the event of a substantial leakage flaw, circuit means which upon said first pressure being achieved automatically in conjunction with said means to allow the egress of gas from the interior of a glove causes the reduction of the pressure within said glove from said first pressure to a second pressure, circuit means associated with said means in communication with the interior of a glove capable of detecting the pressure thereof which upon said second pressure being achieved signals whether said second pressure is maintained for a predetermined period of time.

In yet a further aspect the invention consists in apparatus for testing products capable of being inflated such as a surgical glove which has a single intended opening thereto, said apparatus comprising:

means for sealably mounting said product adjacent and about said single intended opening thereof, said means including means capable of allowing the ingress of gas under pressure into said product, capable of allowing the egress of gas from said product and means capable of detecting by direct communication with the interior of said product any pressure achieved within said product, means operable to rigidly constrain said product against substantial inflation in inflatable regions thereof when mounted on the mounting means, means capable in use of applying gas to a predetermined first pressure to a product mounted on the mounting means and constrained, and capable of reducing the pressure in the product from said first pressure to a second pressure, said first pressure and second pressure being detectable by the pressure detecting means, circuit means operatively associated with the means to said first and second pressure and with the pressure detecting means which is capable in use of generating signals to an operator that a product should be rejected if said first pressure is not attained within some predetermined period of time after the gas pressure is applied, is capable of reducing the pressure within the product from said first pressure if that pressure is attained to said second pressure and thereafter is capable of generating a signal if the reduced second pressure is not maintained for a predetermined testing period.

In a further aspect the invention consists in apparatus for testing a product capable of being inflated such as a surgical glove which has a single intended opening thereto, said apparatus comprising:

means for sealably mounting said product adjacent and about said single intended opening thereof, said means including means capable of allowing the ingress of gas under pressure into said product, capable of allowing the egress of gas from said product and means capable of detecting by direct communication with the interior of said product any pressure achieved within said product, means operable to rigidly constrain said product against substantial inflation in inflatable regions thereof when mounted on the mounting means, means capable in use of applying gas to a predetermined first pressure to the interior of a product mounted on the mounting means and constrained, said first pressure being detectable by the pressure detecting means, circuit means associated with said means in communication with the interior of a glove capable of detecting the pressure thereof which signals a failure to achieve said first pressure in the event of a substantial leakage flaw, circuit means which upon said first pressure being achieved automatically allows the egress of gas from within said glove to cause a reduction from from said first pressure to a second pressure, circuit means associated with said means in communication with the interior of a glove capable of detecting the pressure thereof which upon said second pressure being achieved signals whether said second pressure is maintained for a predetermined period of time.

Preferably the first pressure is about 7 psi and preferably the second pressure is about 6 psi. Irrespective of what the first and second pressures are preferably the second pressure is about 1 psi below said first pressure.

Preferably the testing period is in the range of from 1 to 60 seconds and is ideally within the range of from about 1 second to about 8 second.

Preferably a partial inflation of the product with a low pressure occurs prior to the constraining surfaces being applied thereto, and prior to the product being taken to said first pressure.

BRIEF DESCRIPTION OF THE DRAWINGS

The preferred form of the present invention will now be described with reference to the accompanying drawings in which:

FIG. 10 is a front view of the apparatus in accordance with the present invention showing how the same can be combined in an aesthetic and compact cabinet, and FIG. 11 is a view C—C of the cabinet shown in FIG. 10.

DETAILED DESCRIPTION OF THE INVENTION

The preferred form of the present invention is applicable to surgical gloves which persons skilled in that art will appreciate must as far as possible provide a non-porous yet extremely thin and flexible hand covering membrane. Persons skilled in the art will appreciate that if a supply of air or other gas at even one or two pounds per square inch is applied through the sealed cuff region of the glove that the glove will expand to destruction as the tensile strength of the material from which they are customarily made is not sufficient to hold the same against such continued inflation. Hence the normal testing of surgical gloves cannot normally be effected under pressures which would allow a substantial amount of leakage through the normally uninflated regions of a surgical glove. Hence while inflation techniques might well be adequate for testing palm regions and the like of surgical glove, pressure limitations do not allow sufficient testing of certain regions thereof.

In accordance with the present invention it will be seen that a higher than normal pressure is applied (i.e. is attained within the product if not defective) although this is not necessarily the case as the testing would be effective with conventional pressures although since the method and apparatus allows for higher pressures which give greater accuracy the higher pressure should preferably be used.

In the preferred form of the present invention gloves in a condition ready for packaging would be moved to a testing station as a first step and at the completion of a previous dusting step if any. The glove would be taken and the cuff region 1 thereof would be moved to overlie the annular surface 2 which includes a flexible O-ring or the equivalent 3 of a substantially disc like mounting member 3A. The mounting member 3A when the cuff region 1 of the surgical glove overlies the same has ports 4 which allow fluid communication with the interior of the glove.

Figure 1:
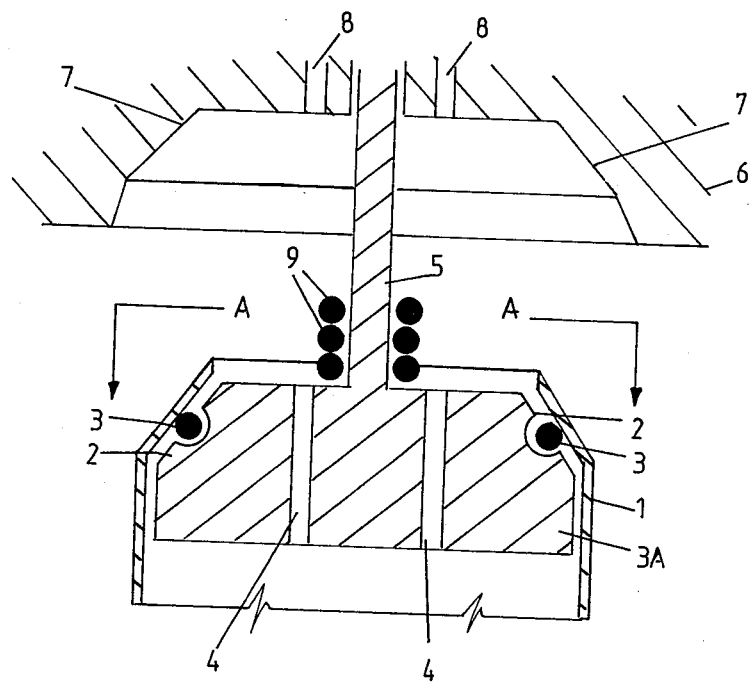
FIG. 1 is a sectionalised view of the mounting means in accordance with the present invention showing the mounting means thereof, and the annular surface over which the cuff regions of a glove overlies during the testing mode.
Figure 2:
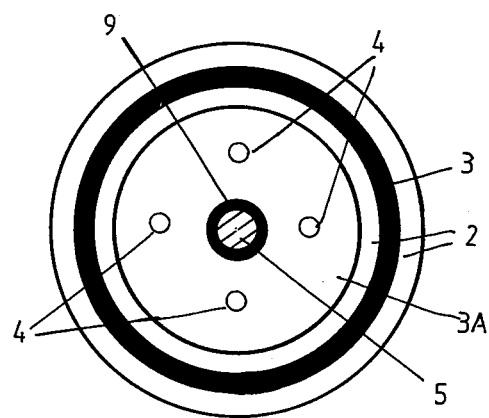
FIG. 2 shows a view A—A pf the arrangement as shown in FIG. 1.

The mounting disc 3A is connected to a member 5 which is slidable relative to means 6 which includes an annular surface 7 capable upon upward movement of the shaft 5 and the disc 3A as shown in FIG. 1 of pressing in a complementary manner on the overlying cuff regions 1 of the surgical glove to thereby provide a sealed mounting of the glove. The upward movement in use of the disc 3A and the shaft 5 would be preferably under the action of a pneumatic ram. Gas ingress inside of the glove would be by way of at least one port 8 in said means 6 and testing of the pressure within the product would preferably be by way of means in communication with the sealed chamber which is defined between said means 6, cuff region 1 and said disc 3A and shaft 5 when the same is moved upwards into its sealing condition. In order to minimise any risk of leakage of gas (preferably air) out of the seals on the shaft 5, a plurality of flexible O-rings 9 are preferably provided on the shaft 5 which deform without interfering with the seal formed between the annular surfaces 2 and 7 in order to prevent leakage to the chamber from any pneumatics or the atmosphere.

Where gloves with a bead on the cuff are being tested a simple annular groove is sufficient.

The view A—A shown in FIG. 1 shows the overlaying regions of the glove 1.

FIGS. 3a to 3d show the normal mode of operation of the apparatus. In the preferred form there are two platens 10 each mounted on a ram 11 capable of moving the same inwardly or outwardly with respect to a surgical glove 12 which is mounted on the mounting disc as shown in FIG. 1. This mounting arrangement is shown diagrammatically in FIGS. 3 to 3d and given reference numeral 13.

Figures 3A, 3B:
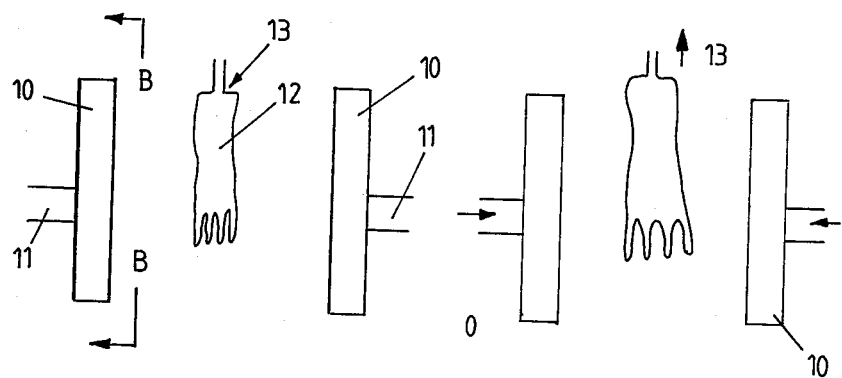
FIGS. 3a to 3d show diagrammatically the mode of operation of the preferred constraints etc and the mounting member with respect to the surgical glove with which it is engaged.
Figures 3C, 3D:
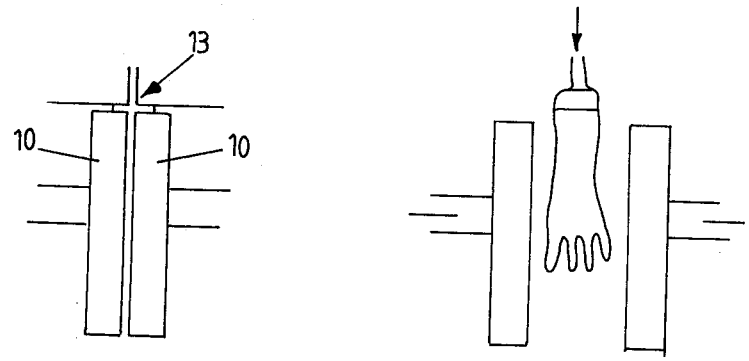
Figure 4:
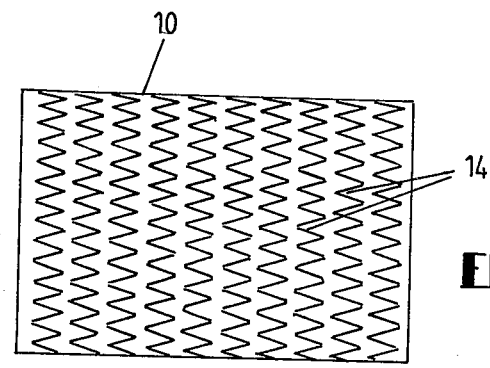
FIG. 4 shows a view B—B of a constraining platen as illustrated in FIG. 3a showing the porous surface thereof.
Figure 5:
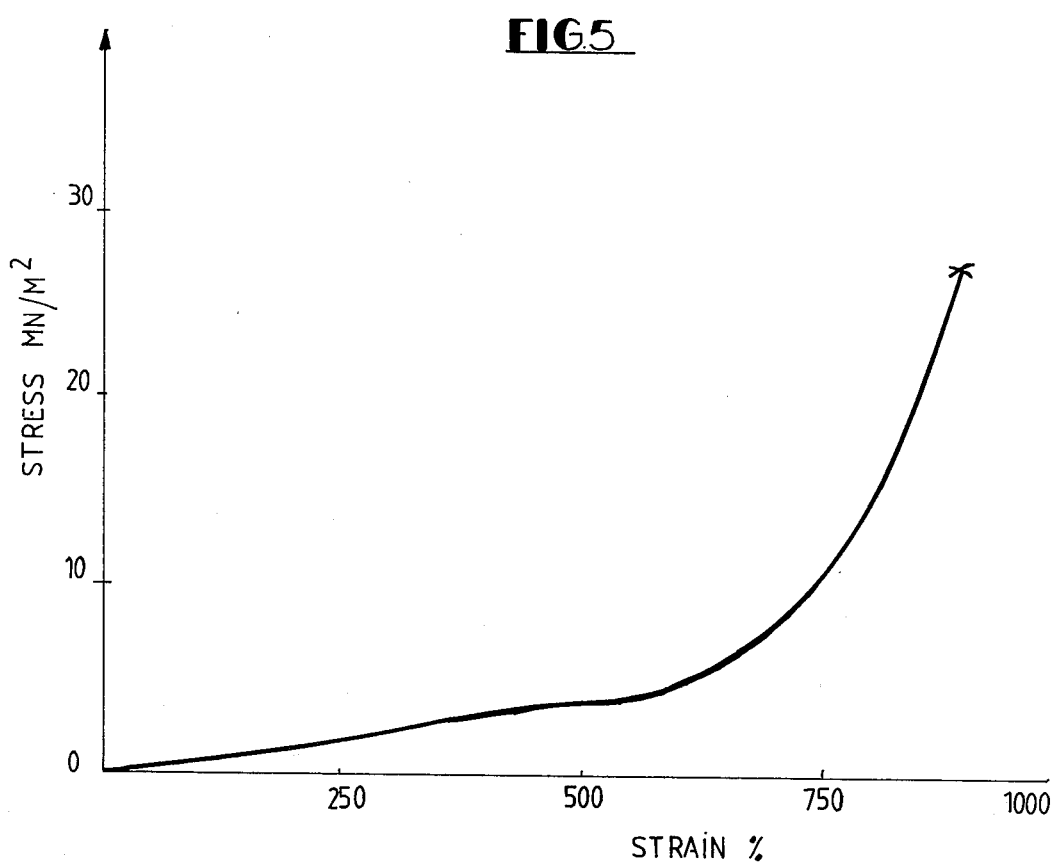
FIG. 5 is a graph of stress against strain for a typical latex rubber from which an inflatable product such as surgical gloves is formed.
Figure 6:
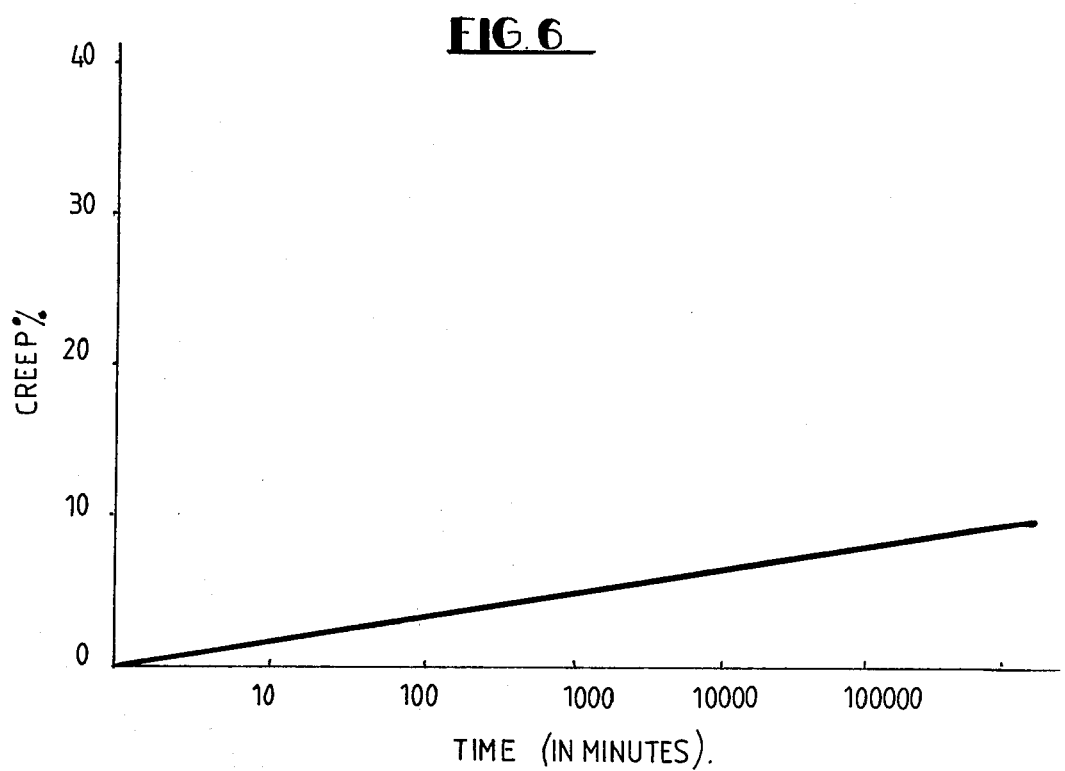
FIG. 6 is a graph of creep against time showing the exponential relationship between creep and time for a typical latex rubber, i.e. the stress relaxation and creep varies approximately linearly with the logarithm of time under load.

Consider FIG. 3a as being the state of a surgical glove that overlies the mounting disc 3A and the annular surface 2 prior to the same being sealed thereonto. The apparatus is then actuated and the means 13 moved upwardly as shown in FIG. 3b in order to provide the seal against the annular surface 7 shown in FIG. 3. At the same time after initial inflation to prevent overlying fingers or shortly thereafter the platens 10 move inwardly so as to constrain the glove as shown in FIG. 3c. Obviously the surface of the platens 10 must be both flexible or formed to the constraining shape and also porous in order to allow leakages to occur to thereby provide the data necessary for rejection or passing of a glove being tested. Preferably this porous surface is achieved using a plurality of coil springs 14 which overlie a reasonably thick substrate of for example open-cell foam rubber. In other forms a porous matrix or even a metal or the like mesh could be used—however the springs are the most preferred form. Ideally the mounting means 13 is positioned at a position after the sealing thereof so that in conjunction with the platens 10 no unconstrained region of the glove occurs which would result in this same being destructively inflated under the preferred pressures of seven to eight pounds.

Once the condition of the apparatus as shown in FIG. 3c has been reached the first pressure (P1) is applied e.g. 7 psi and as soon as that pressure has been attained a rapid reduction to P2 (preferably 6 psi) occurs and a sensor linked for example to a port 8 detects any further drop in pressure. These drops in pressure are automatically analysed preferably by an electronic device which over a time period determines whether or not a decrease if any is sufficient to indicate a leakage which should result in rejection. Ideally the electronic circuit would be such that upon the testing pressure being reached a signal would be given or would not be given, for example, by a light. If that signal does not or does, as the case may be, come up then obviously the hole in the glove is of such a size that the pressure P1 cannot be reached and hence rejection signal should occur. Once P1 and then the reduced testing pressure P2 is attained the apparatus automatically monitors pressure over a predetermined period ranging for example from one minute to a fraction of a second. If a rate or degree of pressure decrease from P2, if any, less than that determined to be indicative of a glove worthy of rejection, is sensed over the predetermined period (for example, one second or alternatively 100ths of a second or for example three seconds) a signal is preferably given to pass the glove. Alternatively preferably a signal is given to reject the glove. These signals are preferably in the form of lights or buzzers.

Subsequent to a signal being given which is indicative of rejection or passing of a particular inflated product means is operator actuated or automatically actuated to move the platens apart and the mounting member 13 downwards as shown in FIG. 3d. Obviously the platen should move apart slightly before any downward movement of the mounting disc should occur. Conversely with the situation as shown in FIG. 3b i.e. the upward movmement should have ceased by the time first contact is made between platens 10 and the glove.

As previously stated it is desirable that some pressure or gas quantity be applied internally of the glove 12 prior to the constraining thereof occurring. This is in order to separate the fingers of the glove to ensure that there is no overlying section thereof. Ideally the glove when being tested should be positioned in such a way that the palm and back of hand regions will when constrained lie against the platen surfaces, i.e. the springs 14, so as to minimise the risk of overlying fingers or the like providing a seal over a hole that should be picked up by the apparatus.

Figure 7:
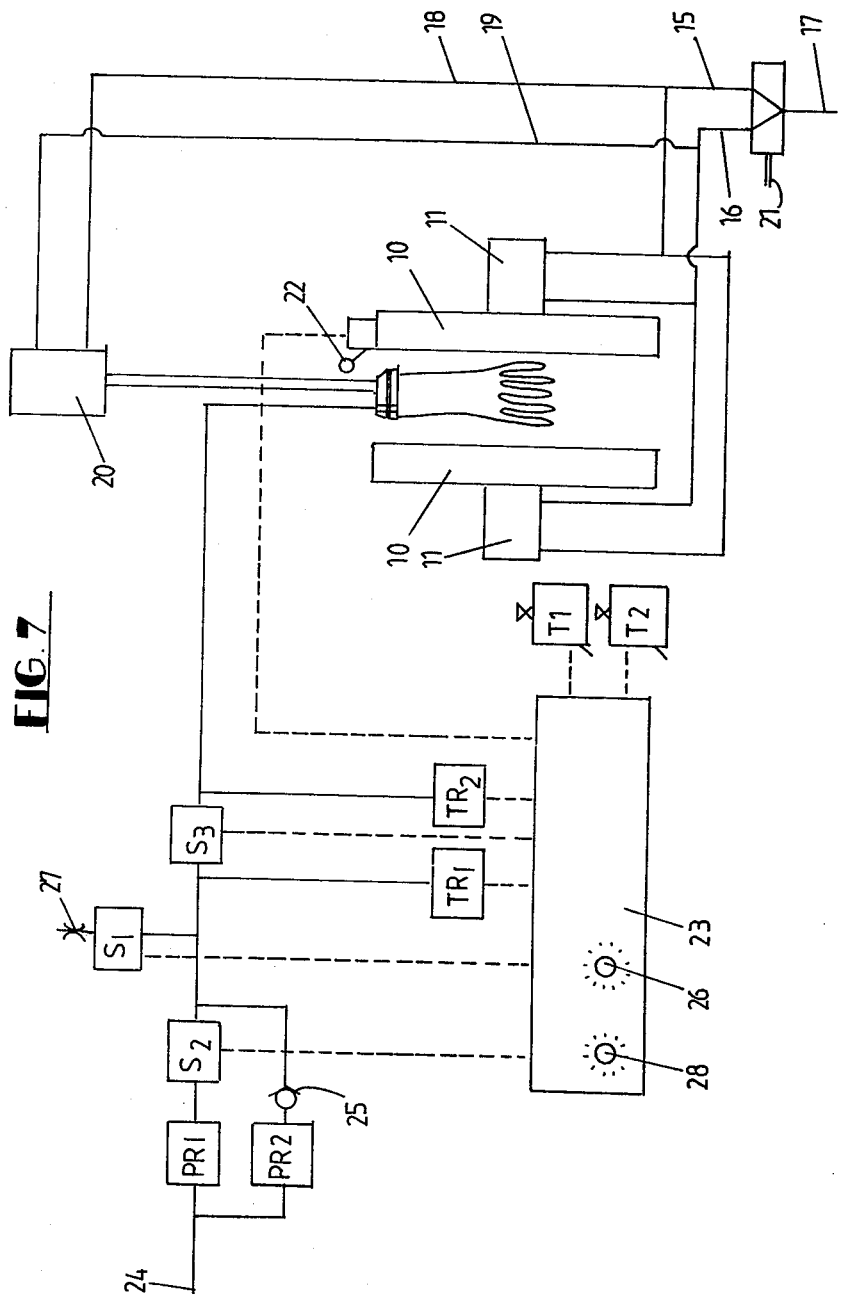
FIG. 7 is a diagrammatic layout showing in solid outline pneumatic circuits and in dotted outline electrical circuits used to effect the testing method in accordance with the present invention.

Referring now to FIG. 7 the preferred pneumatic and electronic layouts will be described. In the layout the following symbols are used:

S = Solenoid
PR1 = Pressure regulator set at 7 psi
PR2 = Pressure regulator set at 1 psi
TR1 = Transducer
TR2 = Transducer
T1 = an adjustable timer
T2 = an adjustable timer.

Referring to FIG. 7 therefor it can be seen that the platens 10 are capable of being moved towards or away from each other under the action of pneumatic rams 11 as previously described under the action of the air lines 15 for closure and 16 for opening. The source of the gas to the pneumatic lines 15 and 16 is a mains airline 17 of preferably 70 to 100 psi.

As previously described a pneumatic movement is necessary in order to close the mounting and in this regard lines 18 and 19 are linked to lines 15 and 16 directly or indirectly so that upon the initiation of the pneumatic pressure the rams 11 of the platens 10 and the ram 20 of the mount are actuated so as to take the mounted glove to its testing condition. The initiation of this sequence of events occurs under the action of the start button 21. It can be seen therefore that with appropriately dimensioned rams the simple actuation of the button or other means e.g. foot pedal 21 will cause a pressurisation of pneumatic rams 11 and 20 so that first the mount is raised to its closed condition which it achieves prior to the platens 10 coming into their constraining condition. As the platens approach however a micro switch or limit switch 22 is actuated in order to commence the logic circuits which are partially pneumatic and partially electronic.

In FIG. 7 the electrical circuits to the console 23 are shown in dotted outline. The mode of operation of the circuit upon initiation at the signal of the switch 22 will now be described.

A similar mains pressure to that in line 17 is fed to line 24 where the same has the option of passing through the pressure regulator PR1 which is set at 7 psi and pressure regulator PR2 which is set at 1 psi. In the line from pressure regulator PR2 there is a one way valve 25 so as to cut off all possibilities of there being a feed back from the pneumatic circuit (shown in solid lines) to pressure regulator PR2.

At the commencement of a testing cycle air at 1 psi passes to the glove as solenoid S2 is closed, S1 is closed and S3 is open. This achieves the partial inflation of the glove even as the glove is being mounted on the mount and prior to the initiation of the whole sequence by the use of button 21. Upon button 21 being actuated the required constraint and air tight mounting of the glove about its cuff regions occurs whereupon limit switch 22 actuation causes the opening of S2 to allow air at 7 psi to flow to the glove. Timer T1 also is initiated. At the end of the preselected period of timer T1 transducer TR2 output is sampled. If TR2 indicates the pressure is less than 7 psi a fail light 26 is energised. If the pressure is 7 psi solenoid S1 is opened and S2 is closed and the glove pressure is thus reduced to 6 psi through the bleed valve 27 which is set at 6 psi. With some forms of the invention however it may not be necessary for solenoid S2 to be closed. The next sequence occurs when a pressure of 6 psi is reached whereupon transducer TR1 or TR2 initiates timer T2 and closes solenoid S3. Preferably transducer TR2 is used for this purpose. At the end of the period set by timer T2 (the period preferably being adjustable within the limits previously mentioned) the differential pressure across solenoid S3 i.e. between transducers TR1 and TR2 is sampled and if the differential pressure is greater than 0 psi the fail light 26 or a different fail light is energised or otherwise a pass light 28 is initiated.

Upon either light 26 or 28 being energised the switching associated with button 21 allows the platens 10 to be separated and the mount of the glove to release its air tight seal and in so doing allows the deactivation of the limit switch 22 which in turn closes solenoid S2 and S1. At the same time S3 is opened so that pressure at 1 psi is passed through for the commencement of a further cycle.

In the preferred form of the present invention a feed back (not shown) between the control unit which includes the lights 26 and 28 occurs so that upon a signal to pass or fail a particular inflatible product occuring the automatic ending of the test occurs with the consequent setting of the apparatus for a subsequent test.

Persons skilled in the art will appreciate viable alternatives to the system just disclosed as being by way of example.

FIGS. 10 and 11 show how the circuit layout of FIG. 7 can be compacted into a console. In that console there can be seen the platens 10 and one of the pneumatic ram units 11 therefore. Also seen is for example, the start button 21, the pass and fail lights 28 and 26, an optional audible alarm 29 which can be used to show either a pass or fail, a pressure meter 30 which can give information concerning the main lines pressure or pressure at any stage throughout the system as a check and controls 21 which can be used to close off if desired the otherwise continuous 1 psi gas flow.

Also shown in FIG. 10 and for that matter FIG. 11 is the combined conduit 32 which takes the air of lines 24 and 17 into the cabinet. The cabinet also has an exhaust conduit 33 which is capable of extracting any dust generated within the cabinet shown in FIG. 10 e.g. loose lubricant dust from the gloves.

Figure 8:
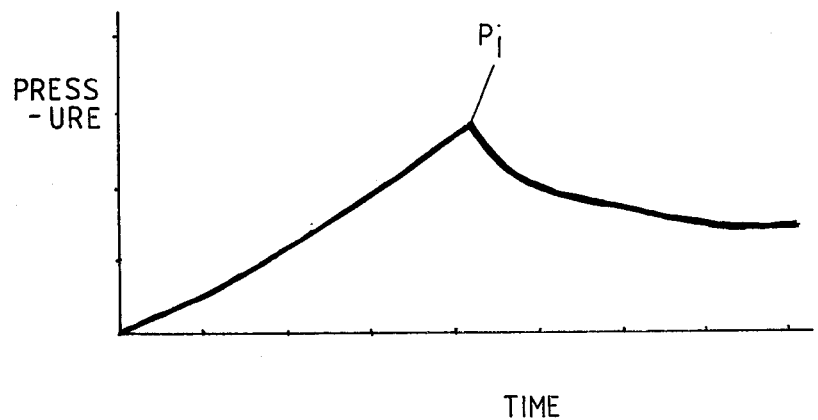
FIG. 8 is a graph of pressure against time for a surgical glove under inflation and under constraint such as that required by the present invention, the graph showing how with time relaxation of the latex after the product has been taken to said first pressure (P1) the pressure falls rapidly and continues to fall but with a decreasing rapidity as time goes on, FIG. 9 is a similar graph to that of FIG. 8 in that it is for the same glove but shows how it is possible at least for finite times necessary for the testing method of the present invention to take a surgical to P1, drop the same rapidly to P2 where upon during the test period there is not the initial rapid decrease that occurs as in FIG. 8.
Figure 9:
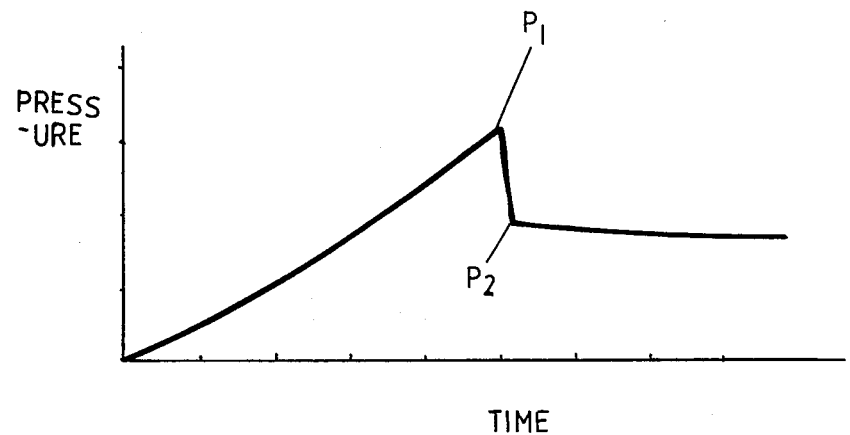

From the foregoing therefore it can be seen that a simple arrangement has been devised to ensure that difficulties of relaxation of the latex rubber or different properties owing to creep are overcome by allowing the timing to occur upon the attainment of P2 as shown in FIG. 9 and not at some stage that results naturally upon the attaining of pressure P1 which can lead to anomalous results owing to the relaxation as demonstrated in FIG. 8. Therefore by adopting the control circuitry etc, of the present invention the anomylous results that would arise from the use of the apparatus of U.S. Pat. No. 919,562 would not occur.

From the foregoing it can be seen that the present invention provides a novel method of testing and a novel apparatus applicable thereto. Such an apparatus it can be seen provides fast and accurate means of testing gloves while at the same time allowing the tests to be conducted virtually automatically by largely unskilled labour. Spoilage rates may be reduced owing to the abovementioned human tendencies being avoided by the improved testing technique as the testing device will rupture and reject substantial weaknesses previously left to the individual operator freeing the said operators from making this important and difficult decision.

In the case where there are gloves with dust inside for lubrication purposes preferably the test is conducted in a semi-enclosed space which is vented so as to exhaust dust therefrom.

From the foregoing then it can be seen that the present invention provides a novel means and method which should find widespread acceptance.

What is claimed is:

1. A method of testing a product capable of being inflated such as a surgical glove against leakage flaws and substantially weak spots which comprises the steps of:
   (a) mounting the product in such a way that the same can be inflated at least partially through an intended opening thereof by applying a gas pressure thereinto,
   (b) rigidly constraining the product against substantial inflation with constraints which in use do not substantially inhibit leakage of gas through leakage flaws and leakage flaws resulting from the breakage of substantially weak spots of said product,
   (c) applying a gas pressure to said product so as to attain a first pressure within said product which said first pressure is a pressure that in the absence of said constraints would be desctructive of said product,
   (d) reducing the pressure within said product upon its attaining said first pressure to a second pressure which itself is a pressure in the absence of said constraints which would be destructive of said product,
   (e) detecting any gas pressure decrease within said product over a testing period commencing upon its attaining said second pressure, and
   (f) rejecting said product as being defective owing to the leakage flaws if said product fails to achieve said first pressure or upon reduction to said second pressure loses pressure unacceptably over said testing period.

2. A method as claimed in claim 1 wherein some gas is applied to the product prior to the rigid constraining thereof.

3. A method as claimed in claim 1 wherein said first pressure is about 7 psi.

4. A method as claimed in claim 3 wherein said second pressure is about 6 psi.

5. A method as claimed in claim 1 wherein said second pressure is about 1 psi below said first pressure.

6. A method as claimed in claim 1 wherein said testing period is within the range of from one second to 60 seconds.

7. A method as claimed in claim 6 wherein said testing period is selected within the range of from about 1 second to about 8 seconds.

8. A method of testing a surgical glove against leakage flaws which comprises the steps of:
   (a) mounting the glove by cuff regions and in such a way that the same can be inflated at least partially by applying a gas pressure thereinto,
   (b) rigidly constraining the glove against substantial inflation with constraints which in use do not substantially inhibit leakage of gas through leakage flaws of said glove,
   (c) applying a gas pressure to said glove so as to attain a first pressure within said glove which said first pressure is a pressure that in the absence of said constraints would be destructive of said glove,
   (d) reducing the pressure within said glove upon its attaining said first pressure to a second pressure which itself is a pressure in the absence of said constraints which would be destructive to said glove,
   (e) detecting any gas pressure decrease within said gloves over a testing period commencing upon its attaining said second pressure, and
   (f) rejecting said glove as being defective owing to leakage flaws if said glove fails to achieve said first pressure or upon reduction to said second pressure loses pressure over said testing period.

9. A method as claimed in claim 8 wherein said glove is mounted by mounting the cuff region of the glove over a member having a substantially annular face and having an annular O-groove into which beaded gloves may be fitted capable of being moved relative to another substantially annular face which applies in use pressure on the beaded cuff region of said glove pulled thereover.

10. A method as claimed in claim 9 wherein at least one of the substantially annular surfaces includes an O-ring mounted symmetrically thereon for the mounting of unbeaded gloves.

11. A method as claimed in claim 8 wherein said first pressure is from about 7 to about 8 psi and said second pressure is about 1 psi below the first pressure.

12. A method as claimed in claim 8 wherein said glove is rigidly constrained by causing a machine to move two complementary constraining surfaces against the inflatible regions of the mounted glove after partial inflation of said glove with low pressure the constraining surfaces each being disposed with respect to a mounted glove so as to constrain one side region of every finger including the thumb of the mounted glove.

13. A method as claimed in claim 8 wherein all of the steps are performed on a machine which after the mounting of said glove and the commencement of gas pressurisation operates automatically and automatically signals whether or not a given glove should be rejected or passed.

14. Apparatus for testing a product capable of being inflated such as a surgical glove which has a single intended opening thereto, said apparatus comprising:
means for sealably mounting said product adjacent and about said single intended opening thereof and capable of allowing the ingress of gas under pressure into and egress of gas from said product,
means operable to rigidly constrain said product against substantial inflation in inflatable regions thereof when mounted on the mounting means,
means capable in use of applying gas to a predetermined first pressure via the mounting means to a constrained and mounted product and capable of reducing the gas pressure in the product to a second pressure,
means in communication with the interior of a product mounted on the mounting means capable of detecting the internal gas pressure thereof,
circuit means operatively connected to the means to apply a predetermined first gas pressure and capable of reducing the pressure to a second pressure and to the pressure detecting means and which is capable of generating signals to an operator that a product should be rejected if said first pressure is not attained within some predetermined period of time, is capable of reducing the pressure within the product from said first pressure if that pressure is attained to said second pressure and thereafter is capable of generating a signal if the reduced second pressure is not substantially maintained for a predetermined testing period.

15. Apparatus as claimed in claim 14 wherein said circuit means includes means whereby said predetermined testing period can be varied.

16. Apparatus as claimed in claim 14 wherein said means operable to rigidly constrain said product against substantial inflation comprises two platens moveable to encase the product being tested over inflatible regions thereof.

17. Apparatus as claimed in claim 16 wherein each said platen has a porous surface thereof defined by a plurality of substantially rigid coil springs which lie with their longitudinal axes substantially in the surface of the substrate of the platen and which are constrained from deforming from their longitudinal axes.

18. Apparatus as claimed in claim 14 wherein said mounting means comprises a mounting member which has a substantially annular surface over which regions about said single intended opening of the product can be overlaid and means capable of co-acting with said substantially annular surface in order to sealably squeeze the overlaid regions of said product to thereby provide the sealable mounting of said product adjacent and about its single intended opening, there being provided at least one port through said mounting member capable of allowing the ingress of gas under pressure into the said product and which forms part of said means in communication with the interior of a product mounted on the mounting means capable of detecting the pressure thereof.

19. Apparatus as claimed in claim 14 wherein said means operable to rigidly constrain said product and said means for sealably mounting said product are mounted in a substantially enclosed space which said substantially enclosed space has associated therewith means to exhaust air and any dust entrained therein therefrom.

20. Apparatus for testing a surgical glove which has a single intended opening thereto, said apparatus comprising:
means for sealably mounting a glove at cuff regions thereof and capable of allowing the ingress of gas under pressure into and egress of gas from said glove,
means operable to rigidly constrain said glove against substantial inflation in inflatable regions thereof when mounted on the mounting means,
means capable in use of applying gas to a predetermined first pressure via the mounting means to a constrained glove,
means in communication with the interior of a glove mounted on the mounting means capable of detecting the internal gas pressure thereof,
circuit means associated with said means in communication with the interior of a glove capable of detecting the pressure thereof which signals a failure to achieve said first pressure in the event of a substantial leakage flaw,
means to allow the egress of gas from the interior of a mounted glove to a second pressure,
circuit means which upon said first pressure being achieved automatically in conjunction with said means to allow the egress of gas from the interior of a glove causes the reduction of the pressure within said glove from said first pressure to a second pressure,
circuit means associated with said means in communication with the interior of a glove capable of detecting the pressure thereof which upon said second pressure being achieved signals whether said second pressure is maintained for a predetermined period of time.

21. Apparatus as claimed in claim 20 wherein said last mentioned circuit means signals upon said glove not falling to an internal gas pressure that is slightly below said second pressure.

22. Apparatus as claimed in claim 20 wherein means is provided to allow an operator to select the period of time over which said second pressure must be maintained before a non-rejection signal is given.

23. Apparatus for testing a product capable of being inflated such as a surgical glove which has a single intended opening thereto, said apparatus comprising:
means for sealably mounting said product adjacent and about said single intended opening thereof, said means including means capable of allowing the ingress of gas under pressure into said product, capable of allowing the egress of gas from said product and means capable of detecting by direct communication with the interior of said product any pressure achieved within said product,
means operably to rigidly constrain said product against substantial inflation in inflatable regions thereof whe mounted on the mounting means, means capable in use of applying gas to a predetermined first pressure to a product mounted on the mounting means and constrained and capable of reducing the pressure in the product from said first pressure to a second pressure, said first pressure and second pressure being detectable by the pressure detecting means, circuit means operatively associated with the means to provide said first and second pressures and with the pressure detecting means which is capable in use of generating signals to an operator that a product should be rejected if said first pressure is not attained within some predetermined period of time after the gas pressure is applied, is capable of reducing the pressure within the product from said first pressure if that pressure is attained to said second pressure and thereafter is capable of generating a signal if the reduced second pressure is not maintained for a predetermined testing period.

24. Apparatus for testing a product capable of being inflated such as a surgical glove which has a single intended opening thereto, said apparatus comprising:

means for sealably mounting said product adjacent and about said single intended opening thereof, said means including means capable of allowing the ingress of gas under pressure into said product, capable of the egress of gas from said product and means capable of allowing detecting by direct communication with the interior of said product any pressure achieved within said product, means operable to rigidly constrain said product against substantial inflation in inflatable regions thereof when mounted on the mounting means, means capable in use of applying gas to a predetermined first pressure to the interior of a product mounted on the mounting means and constrained, said first pressure being detectable by the pressure detecting means, circuit means associated with said means in communication with the interior of a glove capable of detecting the pressure thereof which signals a failure to achieve said first pressure in the event of a substantial leakage flaw, circuit means which upon said first pressure being achieved automatically allows the egress of gas from within said glove to cause a reduction from said first pressure to a second pressure, circuit means associated with said means in communication with the interior of a glove capable of detecting the pressure thereof which upon said second pressure being achieved signals whether said second pressure is maintained for a predetermined period of time.

25. Apparatus as claimed in claim 24 wherein means is provided to apply some gas to the interior of a product prior to said means operating to rigidly constrain said product against substantial inflation.

* * * * *